United States Patent
Srivastava et al.

(10) Patent No.: US 9,323,703 B2
(45) Date of Patent: *Apr. 26, 2016

(54) FACILITATING RESOURCE USE IN MULTICYLE ARBITRATION FOR SINGLE CYCLE DATA TRANSFER

(71) Applicant: International Business Machines Corporation, Armonk, NY (US)

(72) Inventors: Vibhor K. Srivastava, Sitapur (IN); Brian T. Vanderpool, Bryon, MN (US)

(73) Assignee: International Business Machines Corporation, Armonk, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 14/056,012

(22) Filed: Oct. 17, 2013

(65) Prior Publication Data
US 2015/0095539 A1    Apr. 2, 2015

Related U.S. Application Data

(63) Continuation of application No. 14/043,935, filed on Oct. 2, 2013.

(51) Int. Cl.
*G06F 13/37* (2006.01)
*G06F 13/372* (2006.01)

(52) U.S. Cl.
CPC .............. *G06F 13/37* (2013.01); *G06F 13/372* (2013.01)

(58) Field of Classification Search
CPC ..... G06F 13/37; G06F 13/372; G06F 13/374; G06F 13/376

USPC .................................................. 710/316, 317
See application file for complete search history.

(56) References Cited

U.S. PATENT DOCUMENTS

| 8,135,024 | B2 | 3/2012 | Abel et al. | |
|---|---|---|---|---|
| 8,352,669 | B2* | 1/2013 | Wu | H04L 49/101 710/242 |
| 2003/0156597 | A1* | 8/2003 | Eberle | H04L 12/40019 370/447 |
| 2014/0122771 | A1* | 5/2014 | Chrysos | G06F 13/42 710/317 |

OTHER PUBLICATIONS

U.S. Appl. No. 14/043,935, entitled "Facilitating Resource Use in Multicycle Arbitration for Single Cycle Data Transfer", filed Oct. 2, 2013.

* cited by examiner

*Primary Examiner* — Glenn A Auve
(74) *Attorney, Agent, or Firm* — Patterson & Sheridan, LLP

(57) ABSTRACT

Techniques are disclosed to provide arbitration between input ports and output ports of a switch. For each of at least one input port of a group of input ports, a respective request is received specifying for the respective input port to be allocated a clock cycle in which to send data to a group of output ports. A grant of the request of a primary input port is issued at each clock cycle, the primary input port including a first input port of the at least one input port. Upon a determination, subsequent to a first clock cycle count elapsing, that an input arbiter has not yet accepted any grant of the request of the primary input port, a grant is issued at each clock cycle, including alternating between issuing a grant of the request of the primary input port and of an alternate input port, respectively.

20 Claims, 8 Drawing Sheets

FACILITATING RESOURCE USE IN MULTICYLE ARBITRATION FOR SINGLE CYCLE DATA TRANSFER

CROSS-REFERENCE TO RELATED APPLICATION

This application is a continuation of co-pending U.S. patent application Ser. No. 14/043,935, filed Oct. 2, 2013. The aforementioned related patent application is herein incorporated by reference in its entirety.

BACKGROUND

Embodiments disclosed herein relate to computer networking. More specifically, embodiments disclosed herein relate to providing arbitration between input ports and output ports of a network switch.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

SUMMARY

Embodiments disclosed herein provide a computer-implemented method to provide request-grant-accept arbitration between at least an input arbiter and an output arbiter in a distributed switch. The input arbiter is operatively connected to a group of input ports of the distributed switch, and the output arbiter is operatively connected to a group of output ports of the distributed switch. The computer-implemented method includes receiving, for each of at least one input port of the group of input ports, a respective request specifying for the respective input port to be allocated a clock cycle in which to send data to the group of output ports, where the respective request is received from the input arbiter and by the output arbiter. The computer-implemented method also includes issuing a grant of the request of a primary input port at each of a first predefined count of consecutive clock cycles, the primary input port including a first input port of the at least one input port, wherein the grant is issued by the output arbiter and to the input arbiter. The computer-implemented method also includes, upon determining, subsequent to the first predefined count of consecutive clock cycles elapsing, that the input arbiter has not yet accepted any grant of the request of the primary input port, issuing a grant at each of a second predefined count of consecutive clock cycles, including alternating between issuing a grant of the request of the primary input port and issuing a grant of the request of an alternate input port, respectively.

Other embodiments provide a computer program product to provide request-grant-accept arbitration between at least an input arbiter and an output arbiter in a distributed switch. The input arbiter is operatively connected to a group of input ports of the distributed switch, and the output arbiter is operatively connected to a group of output ports of the distributed switch. The computer program product includes a computer-readable storage medium having program code embodied therewith, the program code executable by one or more computer processors to receive, for each of at least one input port of the group of input ports, a respective request specifying for the respective input port to be allocated a clock cycle in which to send data to the group of output ports, where the respective request is received from the input arbiter and by the output arbiter. The program code is also executable to issue a grant of the request of a primary input port at each of a first predefined count of consecutive clock cycles, the primary input port including a first input port of the at least one input port, wherein the grant is issued by the output arbiter and to the input arbiter. The program code is also executable to, upon determining, subsequent to the first predefined count of consecutive clock cycles elapsing, that the input arbiter has not yet accepted any grant of the request of the primary input port, issue a grant at each of a second predefined count of consecutive clock cycles, including alternating between issuing a grant of the request of the primary input port and issuing a grant of the request of an alternate input port, respectively.

Embodiments disclosed herein provide a system to provide request-grant-accept arbitration between at least an input arbiter and an output arbiter in a distributed switch. The input arbiter is operatively connected to a group of input ports of the distributed switch, and the output arbiter is operatively connected to a group of output ports of the distributed switch. The system includes one or more computer processors and a memory containing a program which, when executed by the one or more computer processors, is configured to perform an operation that includes receiving, for each of at least one input port of the group of input ports, a respective request specifying for the respective input port to be allocated a clock cycle in which to send data to the group of output ports, where the respective request is received from the input arbiter and by the output arbiter. The operation also includes issuing a grant of the request of a primary input port at each of a first predefined count of consecutive clock cycles, the primary input port including a first input port of the at least one input port, wherein the grant is issued by the output arbiter and to the input arbiter. The operation also includes, upon determining, subsequent to the first predefined count of consecutive clock cycles elapsing, that the input arbiter has not yet accepted any grant of the request of the primary input port, issuing a grant at each of a second predefined count of consecutive clock cycles, including alternating between issuing a grant of the request of the primary input port and issuing a grant of the request of an alternate input port, respectively.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
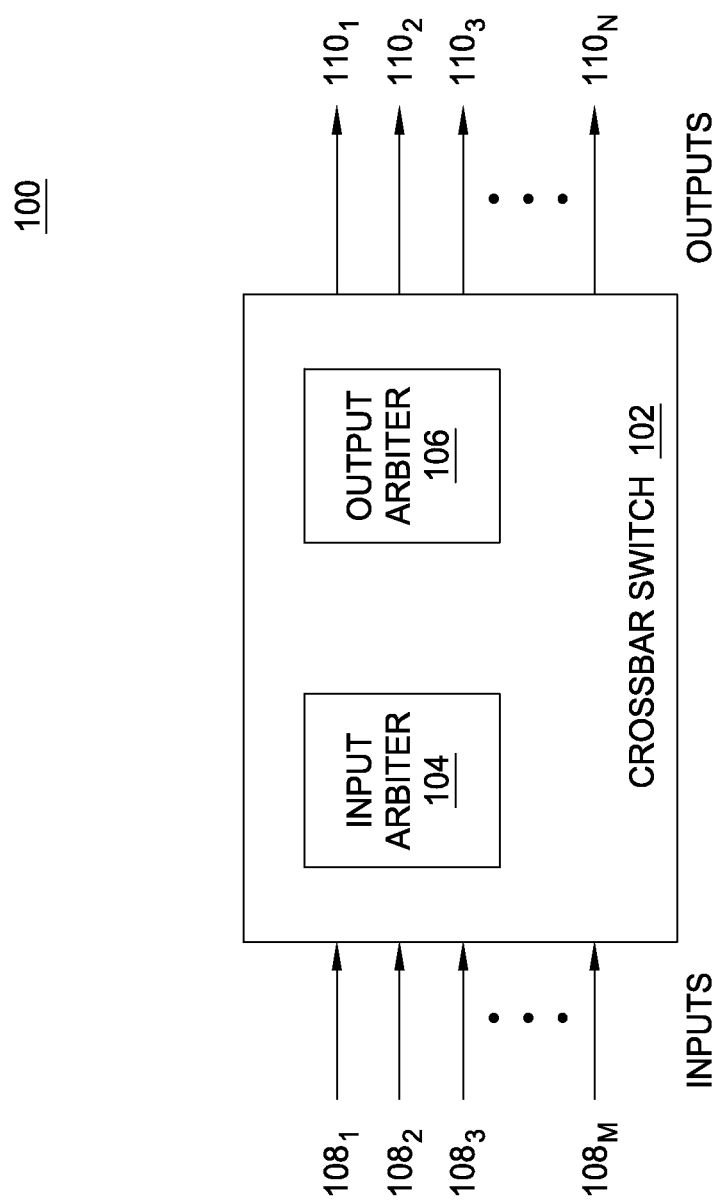
FIG. 1 is a schematic illustrating a crossbar switch configured to provide request-grant-accept arbitration, according to one embodiment presented in this disclosure.

Embodiments disclosed herein provide techniques to implement a scheduling scheme for a crossbar scheduler that provides distributed request-grant-accept arbitration between input arbiters and output arbiters in a distributed switch.

As the processing power of data centers continue to increase, data processing requirements and data production rates are also increasing as a result. Thus, it is desirable to manage networks more efficiently in order to cater to the increasing requirements of data centers. For instance, to that end, control information should be routed efficiently across the network and between participating servers, without consuming too much bandwidth of the network. Embodiments presented herein describe techniques for handling the control information in such a manner at least in some cases. At least in some embodiments, the techniques are performed by a crossbar scheduler component of a distributed switch.

Crossbars serve as building blocks for on-chip interconnects and off-chip switching fabrics, such as those found in data centers. Crossbars having a high port count, also referred to as high-radix crossbars, are often desirable, because they allow larger networks to be created with fewer silicon chips and, hence, less cost. Despite technology scaling, crossbar port scaling is limited by the quadratic cost of crossbars as well as by the targeted port speed, which also increases from one silicon generation to the next. The challenge of crossbar port scaling may be viewed as a problem of routing a large number of wires in a small area of silicon. Even in cases where it seems feasible on paper, placement-and-routing tools may still find it difficult to determine efficient wire routing given such constraints. Further, having a large number of input and/or output ports can increase the chip area required, which may necessitate pipelining data transfers across the chip.

A similar challenge may also hold true for crossbar schedulers, for which scalability with the crossbar data-path is also advantageous. Crossbar schedulers may be based on a distributed request-grant arbitration between input and output arbiters. Further, crossbar schedulers include flat schedulers and hierarchical schedulers. Flat schedulers, having only one arbiter for each input port and output port, respectively, can often outperform hierarchical schedulers at least in terms of delay-throughput and fairness. However, routing the wires between M input and N output arbiters, where M and N are integers, requires a full-mesh interconnect having quadratic cost, which may be prohibitively expensive for crossbars with more than a given number of input and/or output ports, such as 64 ports. To overcome this cost, hierarchical scheduling may be implemented, in which inputs are organized into groups, referred to as quads, with arbitration being performed at a quad level rather than at a port level.

As crossbars increase in size, it may be advantageous to spread arbitration over multiple cycles and to pipeline arbitration. Provided that the arbitration phase is shorter than a resulting data transfer, the multi-cycle arbitration need not be a limiting factor as far as performance is concerned. On the other hand, if the data transfer is shorter than the arbitration phase, the arbitration may become a bottleneck to performance. In one embodiment, the arbitration may be based on a three-phase scheme that includes request, grant, and accept phases. Under the scheme, input arbiters create requests; output arbiters next look at all incoming requests and choose one request to grant; the input arbiters then choose a grant to accept. The requests and/or grants may be chosen based on predefined pointers, such as next-to-serve pointers. At least in some cases, the more accurately the pointers are maintained, then the greater extent to which fairness in resource allocation is maintained between the input and output ports.

Although at least some embodiments are herein described in conjunction with a single-cycle data transfer for transmitting control information packets by a crossbar switch and with a three-cycle arbitration phase in a manner to maintain fairness between the input and output ports, such is not intended to be limiting of disclosed embodiments, and other embodiments are broadly contemplated. For example, the techniques disclosed herein may be adapted to implement arbitration for any arbitrary data transfer cycle length, arbitration phase length, input port count, output port count, data type, switch type, etc.

FIG. 1 is a schematic 100 illustrating a crossbar switch 102 configured to provide request-grant-accept arbitration, according to one embodiment presented in this disclosure. The crossbar switch 102 communicably connects input ports $108_{1-M}$ to output ports $110_{1-N}$. Depending on the embodiment, the input ports and output ports are each organized into a respective, arbitrary number of input groups and/or output groups, in which case arbitration occurs at a group level and/or at a port level. In other embodiments, neither the inputs nor the outputs are organized into groups, in which case arbitration occurs at a port level and not at any group level. As shown, the crossbar switch 102 has arbiters including an input arbiter 104 and an output arbiter 106. Although only one input arbiter and one output arbiter is shown for clarity, in alternative embodiments, the crossbar switch 102 includes arbitrary numbers of input arbiters and output arbiters, respectively. Additionally or alternatively, in embodiments where inputs and/or outputs are organized into groups, each group may have an associated, arbitrary number of arbiters. Collectively, the arbiters control packet flow through the crossbar switch 102.

In one embodiment, the crossbar switch 102 is configured to provide request-grant-accept arbitration using a plurality of distinct modes including a primary mode and an alternate mode. As used herein, the primary mode and the alternate mode may also be referred to as a regular mode and a speculative mode, respectively. In one embodiment, the modes pertain to the output arbiter or any component associated with the output arbiter in the crossbar switch 102. In the primary mode, the output arbiter issues a grant of a request of a primary input port at each clock cycle until the grant is accepted, in which case the output arbiter moves on to grant a request of a next primary input port. In the alternate node, the output arbiter alternates between issuing a grant of the request of the primary input port and issuing a grant of a request of an alternate input port, respectively. To that end, the crossbar switch 102 switches between the modes—and selects ports as primary input ports and as alternative input ports, respectively—according to predefined protocols discussed in further detail below. Doing so may increase the frequency of grant acceptance and improve the rate of data transfer at least in some cases, at least relative to alternative arbitration approaches that do not adopt the plurality of distinct modes, while maintaining fairness in allocating resources—e.g., output ports—to input ports of the crossbar switch 102.

In one embodiment, each input port includes a set of entries stored in buffers, each entry specifying an output port requested by a given transaction. At each clock cycle, zero or more of the input ports each raise a request for availability of one or more respective output ports. Each output port receives, at each clock cycle, zero or more requests from the input ports and concerning the availability of the respective output port. Each request is sustained until served following the output arbiter indicating acceptance of the respective request for the requested input port(s). The output arbiter is configured to arbitrate among the requesting input ports in order to select a primary input port to which a grant is to be issued at the next clock cycle. Signals—such as requests, acceptances, and grants—that are sent between input and output ports managed by given arbiters may, for sake of explanation herein, be regarded as sent by the ports themselves or by the arbiters at issue. Similarly, signals sent between the arbiters and pertaining to specific ports may, for sake of explanation herein, be regarded as being sent by the arbiters or by the ports at issue.

In one embodiment, each input port receives zero or more grants from the output ports, responsive to requests previously made by the input ports. The input arbiter is configured to arbitrate among the input ports in order to select a primary input port which grant is to be accepted at the next clock cycle. At least in some embodiments, once an acceptance is issued, the transaction is deemed to be complete.

In one embodiment, to maintain a fair allocation of the output ports, the output ports are allocated among requesting input ports based on a predefined scheduling scheme. One approach prohibits the output ports from advancing to a new primary input port until an acceptance is received from the current primary input port. This is because the input port may not necessarily select a given output port at a given clock cycle, even after having received a grant of the given output port and to the input port—for the input port may be occupied with transmitting data to other output ports at the given clock cycle. In such situations, resources—namely, the given output port—may be underutilized if there are other input ports that are in a better position to accept if offered a grant from the given output port responsive to requests from said other input ports.

Accordingly, at least in some embodiments, the output arbiter maintains an indication of one or more alternate input ports different from the primary input port, the one or more alternate input ports to be issued a grant at certain clock cycles under the predefined scheduling scheme. As described above, in one embodiment, the output arbiter issues a grant to the primary input port at each clock cycle and when operating in the primary mode. On the other hand, when operating in the alternate mode, the output arbiter alternates among issuing a grant to the primary input port and to the one or more alternate input ports. Although at least some embodiments herein are, for clarity, described with reference to alternating among issuing a grant to the primary input port and a single, alternate input port that itself alternates, such is not intended to be limiting of disclosed embodiments, and any number of alternate input ports—whether or not each input port itself alternates—are broadly contemplated. Further, any number of alternate modes, each specifying a distinct pattern of alternating between input ports and/or distinct set of alternate input ports, are also broadly contemplated.

As used herein, embodiments involving multiple input ports other than the primary input port may be regarded as alternating among the primary input port and multiple alternate input ports. Interchangeably, such embodiments may also be regarded as alternating between the primary input port and a single alternate input port that itself alternates among the multiple input ports. Although the single alternate input port is described herein as itself alternating among available input ports other than the primary input port, other embodiments are broadly contemplated. For example, in alternative embodiments, the alternate input port itself alternates among an arbitrary subset of the available input ports, as specified by the predefined scheduling scheme. Further, depending on the embodiment, some or all of the functionality disclosed herein may be performed by the input ports and output ports exclusively, by the input arbiter and output arbiter exclusively, or by a combination of the input and output ports and the respective arbiters.

In one embodiment, the output arbiter switches between modes based on the predefined scheduling scheme. In a particular embodiment, the output arbiter operates in the primary mode until a first predefined time period has elapsed. If the primary input port has still not indicated acceptance of the grant even after the first predefined time period has elapsed, then the output arbiter operates in the alternate mode until a second predefined time period has elapsed. If the primary input port still has not indicated acceptance of the grant even after the second predefined time period has elapsed, then the output arbiter reverts to operating in the primary mode thereafter. Depending on the embodiment, the first and second predefined time periods may be the same in length or different in length. The first and second predefined time periods are user-configurable via respective registers. Further, depending on the embodiment, any units of measurement of the time periods may be used, such as clock cycles, nanoseconds, etc. For instance, the first and second predefined time periods may be expressed in the form of first and second predefined counts of clock cycles, respectively.

Although embodiments are described herein in conjunction with two predefined time periods, other numbers of time periods are broadly contemplated. For example, in an alternative embodiment and subsequent to reverting to the primary mode, if the primary input port has still not indicated acceptance of the grant even after a third predefined time period has elapsed, the output arbiter returns to the alternate mode. And if the primary input port still has not indicated acceptance of the grant even after a fourth predefined time period has elapsed, the output arbiter once again reverts to the primary mode.

In a particular embodiment, the crossbar switch has 136 input ports operatively connected to 136 output ports, in which case the crossbar switch is also referred to as a 136×136 crossbar switch. Each output port is configured to receive, in a given clock cycle, 136 bits of request information, including a single bit from each input port. In one embodiment, the request information may be represented in the form of a 136-bit vector. Each output port determines—or the output arbiter determines on the behalf of the respective output port—a respective primary input port to which a grant is to be issued. Each primary input port may be determined by a predefined selection scheme, such as a pseudorandom selection scheme implemented using at least a linear feedback shift register (LFSR). Once determined, the designation of a given input port as being a primary input port for a given output port remains unchanged until the given input port accepts a grant for the given output port or until the given input port withdraws its request for the given output port. As used herein, the primary input port selected for a given output port at a given clock cycle may also be referred to as a primary winner or regular winner. Further, an alternate input port selected for the given output port at the given clock cycle may also be referred to herein as an alternative winner or speculative winner.

In one embodiment, each input port is configured to receive, in a given clock cycle, 136 bits of grant information, including a single bit from each output port. In one embodiment, the grant information may be represented in the form of a 136-bit vector. In a given clock cycle, an input port is configured to receive zero or more grants responsive to any requests previously raised by the input port. In each cycle, each input port determines—or the input arbiter determines on the behalf of the respective input port—a respective, granted output port to which an acceptance is to be issued. Each such granted output port, also referred to as a winner of winners, may be determined by a predefined selection scheme, such as a pseudorandom selection scheme implemented using at least a linear feedback shift register (LFSR). Depending on the embodiment, the predefined selection scheme may be the same scheme or a different scheme than the one used by the output arbiter as described above.

In one embodiment, each output port may not necessarily—at least for a predefined period of time—receive indications of acceptances in reply to grants previously issued by the respective output port. Upon receiving an indication of acceptance, however, the output port is permitted to select a new primary input port to which a grant is to be issued. As described above, if no indication of acceptance is received from a given primary input port even after a first predefined time period of issuing grants to the given primary input port, then the output arbiter switches from the primary mode to the alternate mode. Depending on the embodiment, the first predefined time period may be represented in terms of the first predefined count of clock cycles, a total count of grants issued since operating in the primary mode, etc. Also as described above, in the alternate mode, the output arbiter alternates between issuing a grant to the primary input port and issuing a grant to an input port selected as the alternate input port.

In one embodiment, the alternate input port itself is selected based on a predefined selection scheme, such as a round robin selection scheme. The predefined selection scheme is applied to a set of input ports, other than the primary input port, currently requesting access to the respective output port. In one embodiment, at each new clock cycle, a different input port in the set is selected as the alternate input port. Put another way, the alternate input port for the respective output port may freely change without first having to receive an indication of acceptance from the alternate input port. This stands in contrast to the primary input port determined for the respective output port, which remains unchanged until a grant is accepted by the primary input port.

As described above, in one embodiment, the output arbiter remains in the alternate mode of operation unless no indication of acceptance is received from the given primary input port even after the second predefined time period, whereafter the output arbiter reverts to the primary mode of operation. Depending on the embodiment, the second predefined time period may be represented in terms of the second predefined count of clock cycles, a total count of grants issued since entering the alternate mode, a count of grants issued to alternative input ports since entering the alternate mode, etc. Once the output arbiter has reverted to the primary mode, the output arbiter once again issues a grant to the primary input port at each cycle.

Advantageously, by arbitrating between input ports and output ports of the crossbar switch accordingly to the techniques disclosed herein, utilization of resources—such as the output ports of the crossbar switch—may be improved at least in some cases, because each output port is not solely committed to a single input port—all while maintaining fairness, because each primary input port designation remains unchanged until a grant is accepted by the respective primary input port.

Figure 2A:
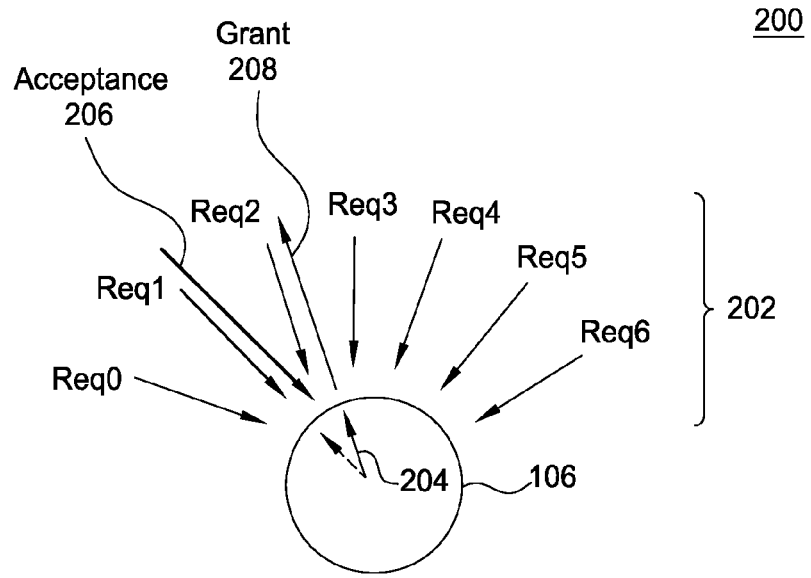
FIGS. 2A-2B depict a schematic of an output arbiter component of the crossbar switch, and an associated signal chart, respectively.
Figure 2B:
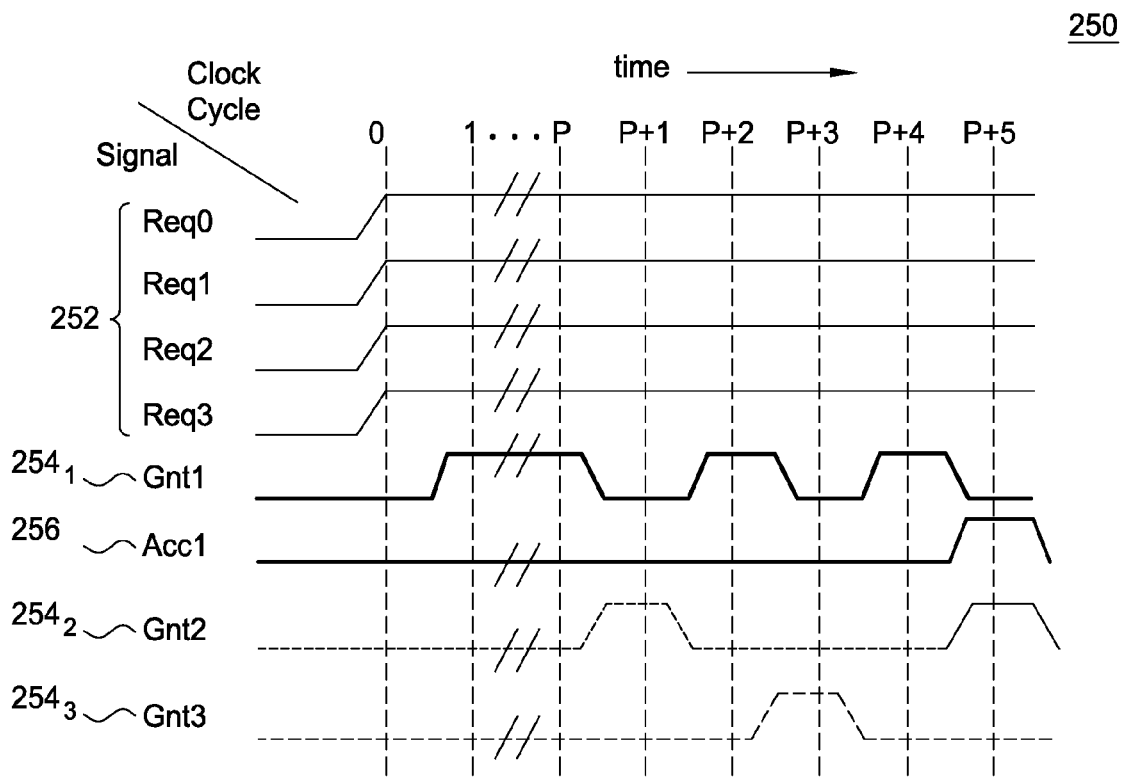

FIGS. 2A-2B depict a schematic 200 of the output arbiter 106 of the crossbar switch, and an associated signal chart 250, respectively. As shown in FIG. 2A, the output arbiter 106 is configured to receive requests 202 from the input ports of the crossbar switch. In the particular embodiment of the 136×136 crossbar switch discussed above, the output arbiter 106 receives up to 136 requests per clock cycle. For clarity, only seven requests are depicted in FIG. 2A, and only four of the seven requests are depicted in FIG. 2B. As described above, the output arbiter 106 is configured to determine, among the input ports requesting a given output port, a particular input port to which a grant is to be issued, also referred to herein as a target input port for the respective output port. Depending on the mode and the clock cycle, the target input port may be the primary input port or the alternate input port. To determine the target input port, the output arbiter 106 may maintain one or more predefined pointers, such as a next-to-serve pointer 204. In one embodiment, upon receiving an acceptance 206 from the primary input port, the next-to-serve pointer 204 may be updated to designate a next requesting input port as the primary input port, to which a grant 208 is sent thereafter. On the other hand, if no acceptance is received from the primary input port within the first predefined time period, the output arbiter 106 switches from the primary mode to the alternate mode, in which the output arbiter 106 alternates between issuing the grant to the primary input port and issuing the grant to an alternate input port, the alternate input port itself alternating among the requesting input ports other than the primary input port.

As shown in FIG. 2B, the signal chart 250 includes request signals 252, grant signals $254_{1-3}$, and an acceptance signal 256. The request signals 252 represent respective requests from each of four input ports. Suppose that at a first clock cycle, designated as clock cycle 0, the output arbiter receives the request signals 252. For a next, first predefined count of clock cycles—given by clock cycles 1 . . . P−1, where P is an integer, and where P−1 represents the first predefined count of clock cycles—the output arbiter sends a grant signal $254_1$ to the requesting input port that is selected as the primary input port. For a next, up to a second predefined count of clock cycles, given in this particular example by clock cycles P . . . P+5, the output arbiter alternates between sending a grant signal $254_1$ to the requesting input port that is selected as the primary input port and sending a grant signal $256_{1,2}$ to whichever input port is selected as the alternate input port for the given clock cycle. During this time period, the output arbiter sends grant signals $254_{2-3}$ to other eligible input ports.

As shown, at the clock cycle P+5, the output arbiter receives the accept signal $256_1$ from the primary input port. The output arbiter may then revert to sending a grant signal to a next primary input port, for up to the first predefined count of clock cycles. Alternatively, had the output arbiter still not received any accept signal $256_1$ from the primary input port after the second predefined count of clock cycles has elapsed, the output arbiter would have reverted to sending the grant signal $254_1$ to the current primary input port thereafter.

Advantageously, by using the techniques disclosed herein to arbitrate between input ports and output ports of a crossbar switch, utilization of the output ports may be improved at least in some cases. For instance, if the grant signals $254_{2-3}$ are accepted, then the throughput of the crossbar switch for the given output port is increased from a single transaction to three transactions in P+5 cycles.

Figure 3:
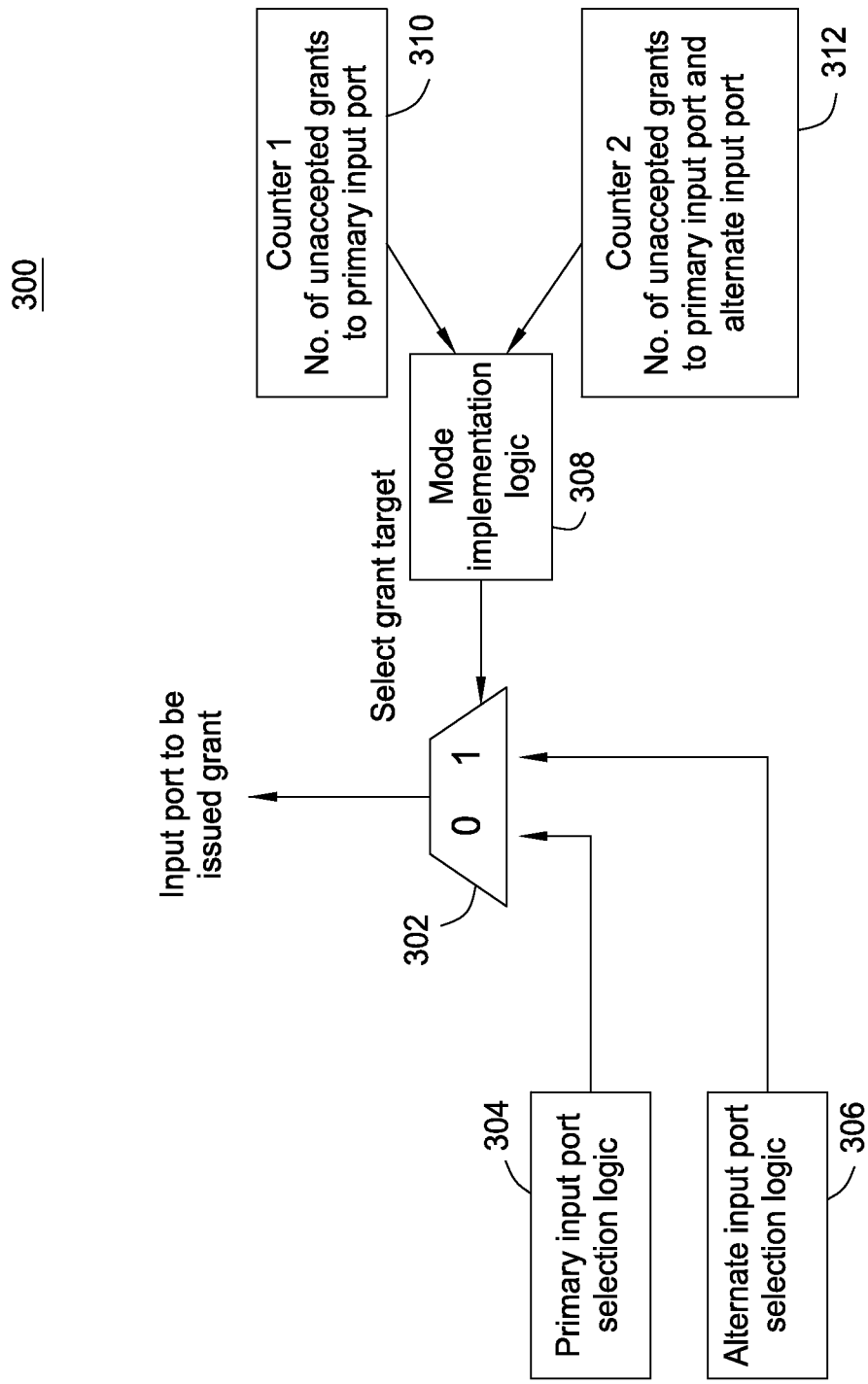
FIG. 3 is a schematic illustrating a set of components of the output arbiter of the crossbar switch, for selecting an input port to which to issue a grant for a given output port, according to one embodiment presented in this disclosure.

FIG. 3 is a schematic 300 illustrating a set of components of the output arbiter of the crossbar switch, for selecting an input port to which to issue a grant for a given output port, according to one embodiment presented in this disclosure. The set of components may constitute a grant determination module of the output arbiter. In one embodiment, the output arbiter may contain, for each output port of the crossbar switch, its own respective grant determination module. As shown, the set of components of the output arbiter include primary input port selection logic 304, alternate input port selection logic 306, and mode implementation logic 308.

In one embodiment, the primary input port selection logic 304 is configured to determine a primary input port according to the techniques disclosed herein, where the primary input port is output to a multiplexor 302. Similarly, the alternate input port selection logic 304 is configured to determine an alternate input port according to the techniques disclosed herein, where the alternate input port is output to the multiplexor 303. The mode implementation logic is configured to select between the primary input port and the alternate input port based on the mode selection and implementation techniques disclosed herein. To this end, the mode implementation logic 308 outputs a selector signal, which serves as a selector input to the multiplexor 302. The mode implementation logic 308 may determine the selector signal based on a set of predefined counters. In one embodiment, the predefined counters include a first counter 310 representing a number of unaccepted grants to the primary input port. The predefined counters may also include a second counter 312 representing a total number of unaccepted grants to the primary input port and the alternate input port. Additionally or alternatively, a third counter may be used, that represents a number of unaccepted grants to the alternate input port. At each cycle, the multiplexor outputs the input port to be issued a grant for the respective input port.

Figure 4A:
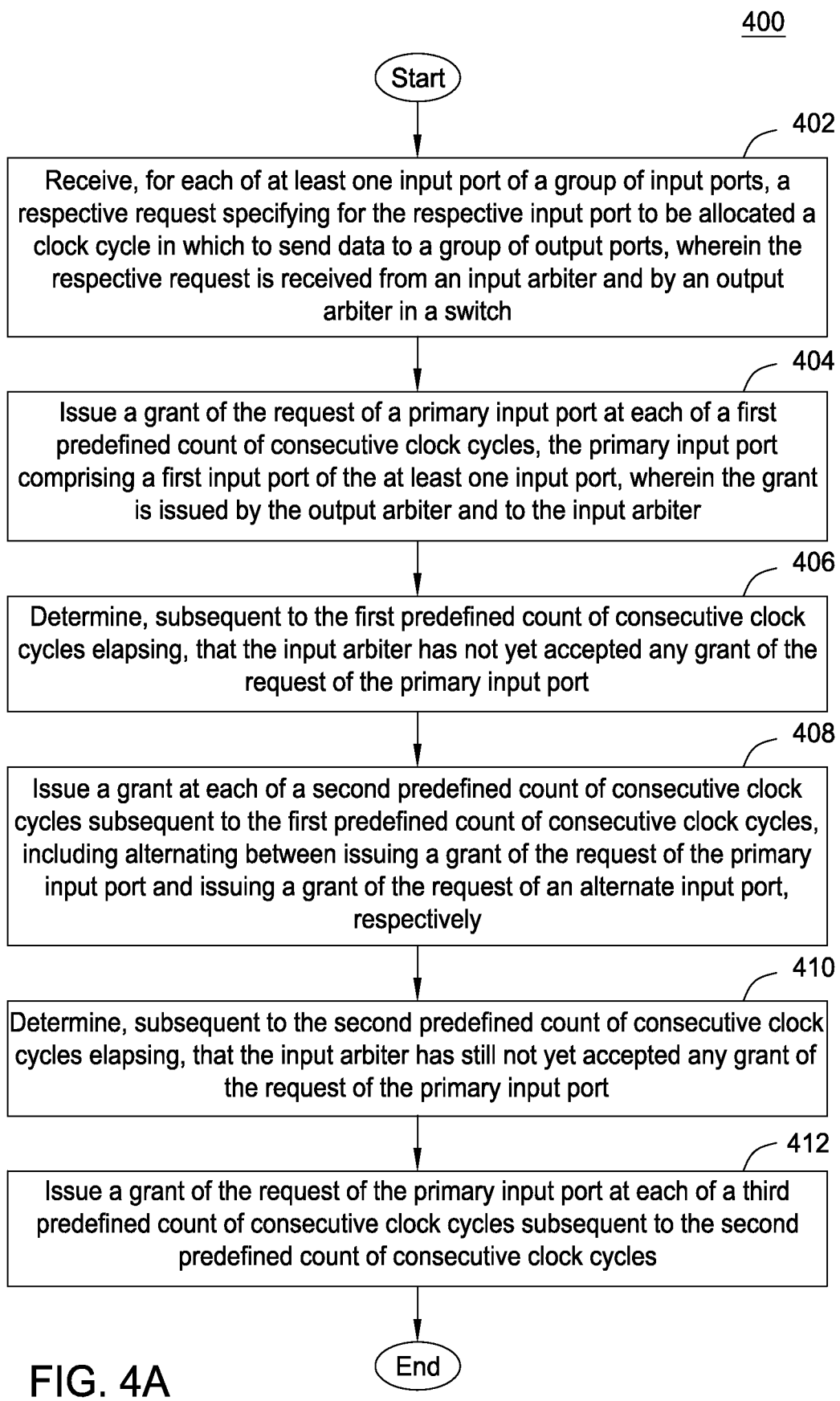
FIGS. 4A-4B are flowcharts illustrating methods to perform a predefined arbitration operation, according to respective embodiments presented in this disclosure.
Figure 4B:
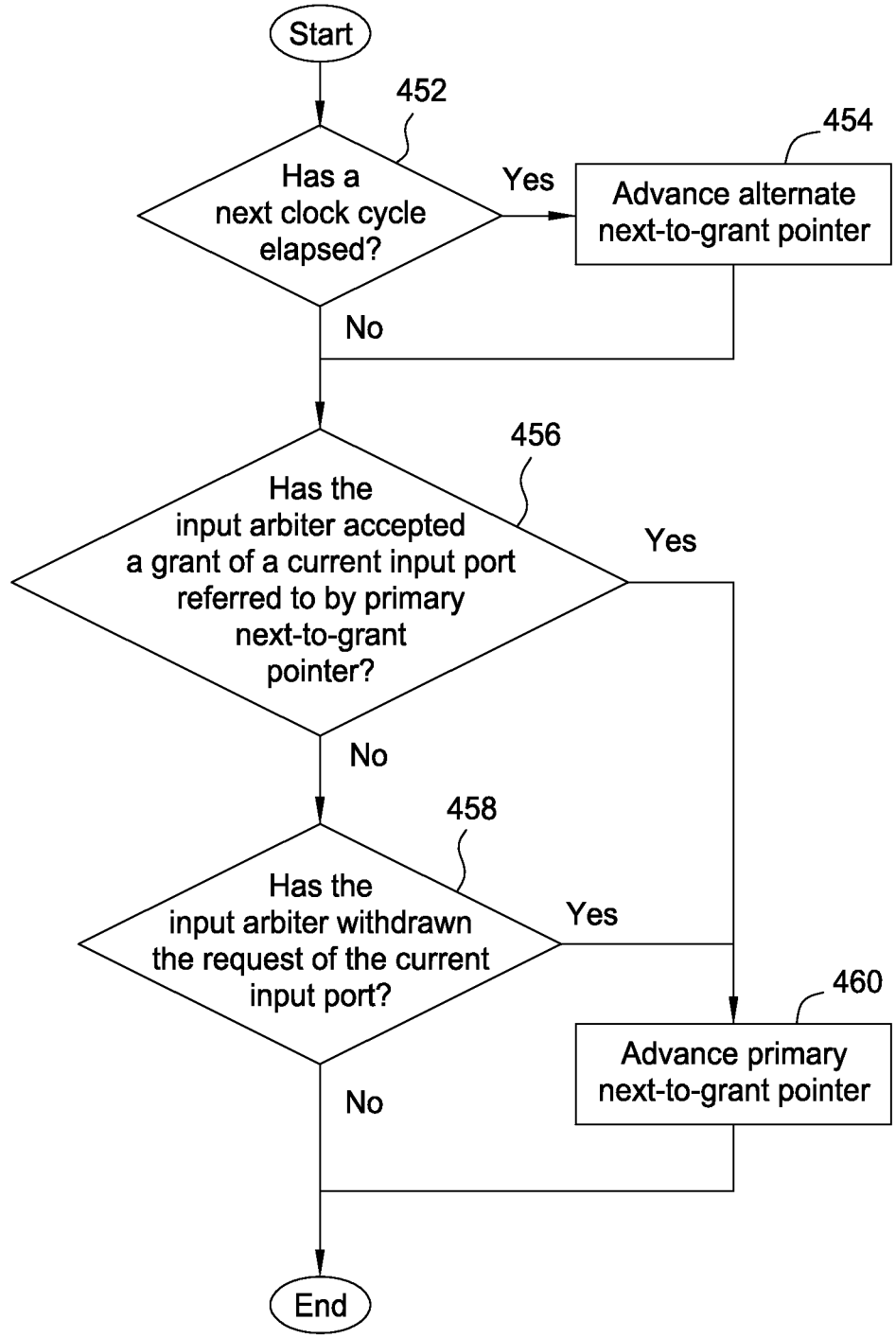

FIGS. 4A-4B are flowcharts depicting methods 400, 450 to provide arbitration between input ports and output ports of a switch, according to respective embodiments presented in this disclosure. In one embodiment, the steps of the methods 400, 450 are performed by a designated component of a distributed switch to provide request-grant-accept arbitration. The distributed switch includes an input arbiter and an output arbiter. The input arbiter is operatively connected to a group of input ports of the distributed switch, and the output arbiter is operatively connected to a group of output ports of the distributed switch.

As shown in FIG. 4A, the method 400 begins at step 402, where the output arbiter receives, for each of at least one input port of the group of input ports, a respective request specifying for the respective input port to be allocated a clock cycle in which to send data to the group of output ports, where the respective request is received from the input arbiter. At step 404, the output arbiter issues a grant of the request of a primary input port at each of a first predefined count of consecutive clock cycles, the primary input port being a first input port of the at least one input port, where the grant is issued to the input arbiter. At step 406, the output arbiter determines, subsequent to the first predefined count of consecutive clock cycles elapsing, that the input arbiter has not yet accepted any grant of the request of the primary input port. At step 408, the output arbiter issues a grant at each of a second predefined count of consecutive clock cycles, including alternating between issuing a grant of the request of the primary input port and issuing a grant of the request of an alternate input port, respectively.

At step 410, the output arbiter optionally determines, subsequent to the second predefined count of consecutive clock cycles elapsing, that the input arbiter still has not yet accepted any grant of the request of the primary input port. At step 412, the output arbiter optionally issues a grant of the request of the primary input port at each of a third predefined count of consecutive clock cycles subsequent to the second predefined count of consecutive clock cycles. After the step 410, the method 400 terminates.

At least in some embodiments, the primary input port and the alternate input port are designated by respective next-to-serve pointers including a primary next-to-grant pointer and an alternate next-to-grant pointer, respectively. These next-to-serve pointers are managed according to the method 450 in FIG. 4B. As shown, the method 450 begins at step 452, where the output arbiter determines whether a next clock cycle has elapsed. If so, then at step 454, the output arbiter advances the alternate next-to-grant pointer to a next eligible input port. Otherwise, at step 456 the output arbiter determines whether the input arbiter has accepted a grant of a current input port referred to by the primary next-to-grant pointer. If so, at step 460 the output arbiter advances the primary next-to-grant pointer. Otherwise, at step 458 the output arbiter determines whether the input arbiter has withdrawn the request of the current input port. If so, the output arbiter also advances the primary next-to-grant pointer (step 460). Otherwise, or after the step 460, the method 450 terminates.

In one embodiment, data is transferred from the group of input ports to the group of output ports upon each grant being accepted by the input arbiter, where accepting a grant includes sending, from the input arbiter to the output arbiter, an indication that the grant is accepted. Further, the primary next-to-grant pointer is updated to refer to a next eligible input port only upon a primary advancement condition being satisfied. The primary advancement condition is, in a first instance, satisfied upon the input arbiter accepting a grant of a request of a current input port referred to by the primary next-to-grant pointer. The primary advancement condition is, in a second instance, satisfied upon the input arbiter withdrawing the request of the current input port. The alternate next-to-grant pointer is updated to refer to a next eligible input port at each clock cycle and regardless of whether the input arbiter has accepted a grant of a current input port referred to by the alternate next-to-grant pointer, where the eligible input port is an input port having queued data to send to the group of output ports. Consequently, the output arbiter may be configured to operate in the alternate mode subsequent to the first predefined count of consecutive clock cycles elapsing and prior to the second predefined count of consecutive clock cycles elapsing, and in the primary mode otherwise.

Accordingly, using the techniques herein, a crossbar scheduler component of the distributed switch may implement a distributed request-grant-accept arbitration including a multi-cycle pipelined arbitration scheme configured to support single-cycle data transfer based on alternating grants. Additional embodiments are broadly contemplated. For instance, in one embodiment, the alternate input port itself alternates between at least two ports of the group of output ports, other than the primary input port, based on a predefined alternate port selection scheme. Accordingly, a measure of utilization of the group of output ports may be improved when the grant of the request of the primary input port is not being accepted and relative to not alternating issues of grants, and a rate of data transfer between the group of input ports and the group of output ports may be increased by virtue of the alternate input port being issued grants at alternative clock cycles.

Further, depending on the embodiment, the second predefined count of consecutive clock cycles may be subsequent to the first predefined count of consecutive clock cycles, and each of the first and second predefined counts of consecutive clock cycles may be configurable via a respective predefined register. In some embodiments, exactly a single grant is issued per output port per clock cycle, and the predefined alternate port selection scheme may be a round robin scheduling scheme. The first input port may be selected as a primary input port based on a predefined primary port selection scheme, where the predefined primary port selection scheme is a pseudorandom scheduling scheme implemented using at least a linear feedback shift register (LFSR).

Further still, in some embodiments, the input arbiter is configured to, at each clock cycle, indicate which of the group of input ports is currently requesting to be allocated a clock cycle in which to send data to the group of output ports. The output arbiter is configured to, at each clock cycle, send a grant vector to the input arbiter. The grant vector includes a separate bit for each input port, each bit containing a bit value indicating whether a request of the respective input port is granted. The input arbiter is configured to, at each clock cycle, send an accept vector to the output arbiter. The accept vector includes a separate bit for each output port, each bit containing a bit value indicating whether a grant of a request the respective input port is accepted.

Figure 5:
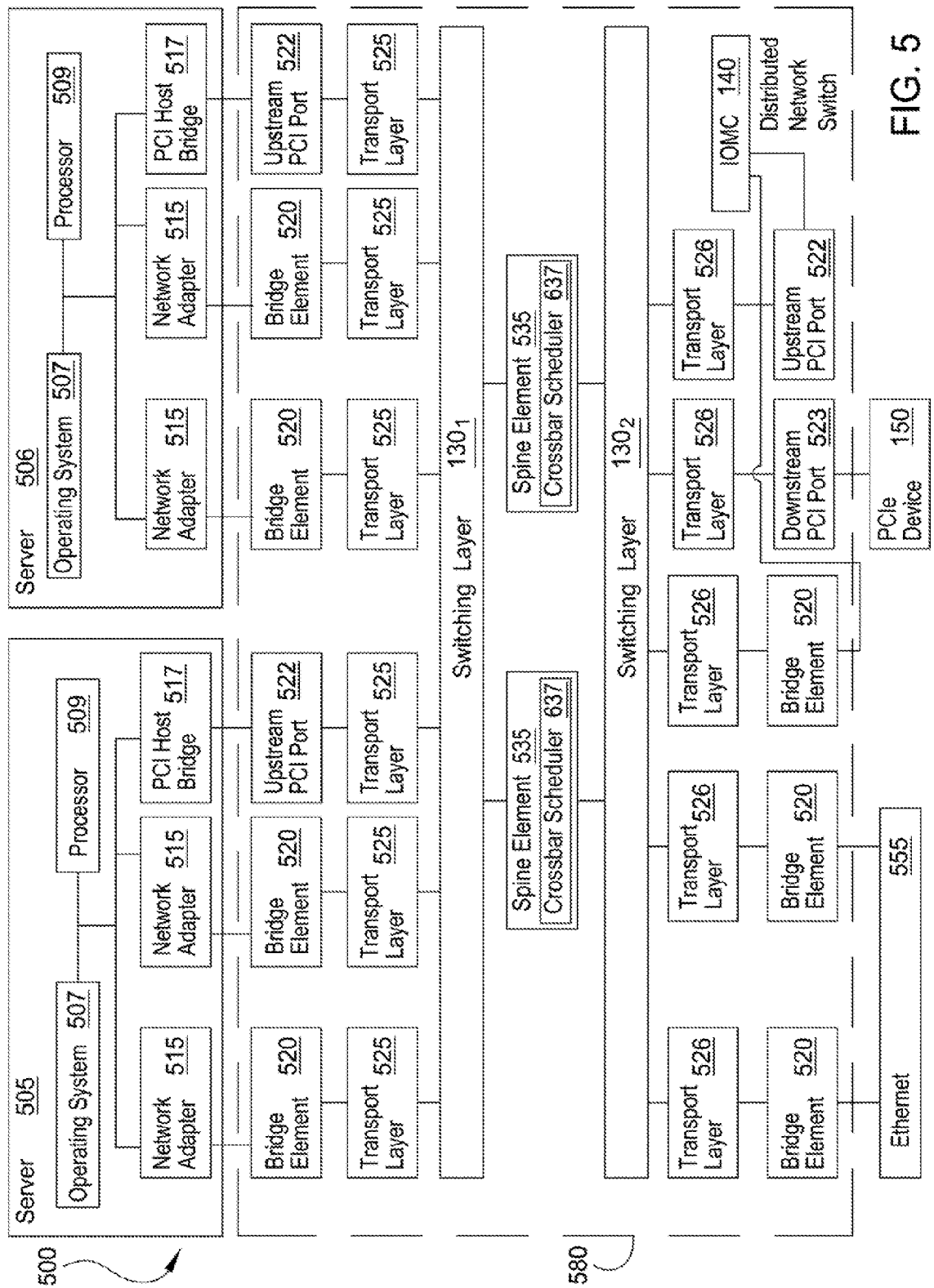
FIG. 5 illustrates a system architecture that includes a distributed, virtual switch, according to one embodiment presented in this disclosure.

FIG. 5 illustrates a system architecture 500 that includes a distributed, virtual switch, according to one embodiment presented in this disclosure. The first server 505 may include at least one processor 509 coupled to a memory (not pictured). The processor 509 may represent one or more processors (e.g., microprocessors) or multi-core processors. The memory may represent random access memory (RAM) devices comprising the main storage of the server 505, as well as supplemental levels of memory, e.g., cache memories, non-volatile or backup memories (e.g., programmable or flash memories), read-only memories, and the like. In addition, the memory may be considered to include memory storage physically located in the server 505 or on another computing device coupled to the server 505.

The server 505 may operate under the control of an operating system 507 and may execute various computer software applications, components, programs, objects, modules, and data structures, such as virtual machines (not pictured).

The server 505 may include network adapters 515 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 500 may include a multi-root I/O virtualization (MR-IOV) adapter. The network adapters 515 may further be used to implement of Fiber Channel over Ethernet (FCoE) protocol, RDMA over Ethernet, Internet small computer system interface (iSCSI), and the like. In general, a network adapter 515 transfers data using an Ethernet or PCI based communication method and may be coupled to one or more of the virtual machines. Additionally, the adapters may facilitate shared access between the virtual machines. While the adapters 515 are shown as being included within the server 505, in other embodiments, the adapters may be physically distinct devices that are separate from the server 505.

In one embodiment, each network adapter 515 may include a converged adapter virtual bridge (not shown) that facilitates data transfer between the adapters 515 by coordinating access to the virtual machines (not pictured). Each converged adapter virtual bridge may recognize data flowing within its domain (e.g., addressable space). A recognized domain address may be routed directly without transmitting the data outside of the domain of the particular converged adapter virtual bridge.

Each network adapter 515 may include one or more Ethernet ports that couple to one of the bridge elements 520. Additionally, to facilitate PCIe communication, the server may have a PCI Host Bridge 517. The PCI Host Bridge 517 would then connect to an upstream PCI port 522 on a switch element in the distributed switch 580. The data is then routed via a first switching layer $530_1$ to one or more spine elements 535. The spine elements 535 contain the hierarchical crossbar schedulers (not pictured), which perform the arbitration operations described above. The data is then routed from the spine elements 535 via the second switching layer $530_2$ to the correct downstream PCI port 523 which may be located on the same or different switch module as the upstream PCI port 522. The data may then be forwarded to the PCI device 550. While the switching layers $530_{1-2}$ are depicted as separate, they logically represent different passes through the same switching layer 530, before and after being routed through one of the spine elements 535.

The bridge elements 520 may be configured to forward data frames throughout the distributed virtual switch 580. For example, a network adapter 515 and bridge element 520 may be connected using two 40 Gbit Ethernet connections or one 100 Gbit Ethernet connection. The bridge elements 520 forward the data frames received by the network adapter 515 to the first switching layer $530_1$, which is then routed through a spine element 535, and through the second switching layer $530_2$. The bridge elements 520 may include a lookup table that stores address data used to forward the received data frames. For example, the bridge elements 520 may compare address data associated with a received data frame to the address data stored within the lookup table. Thus, the network adapters 515 do not need to know the network topology of the distributed switch 580.

The distributed virtual switch 580, in general, includes a plurality of bridge elements 520 that may be located on a plurality of a separate, though interconnected, hardware components. To the perspective of the network adapters 515, the switch 580 acts like one single switch even though the switch 580 may be composed of multiple switches that are physically located on different components. Distributing the switch 580 provides redundancy in case of failure.

Each of the bridge elements 520 may be connected to one or more transport layer modules 525 that translate received data frames to the protocol used by the switching layers $530_{1-2}$. For example, the transport layer modules 525 may translate data received using either an Ethernet or PCI communication method to a generic data type (e.g., a cell) that is transmitted via the switching layers $530_{1-2}$ (e.g., a cell fabric). Thus, the switch modules comprising the switch 580 are compatible with at least two different communication protocols—e.g., the Ethernet and PCIe communication standards. That is, at least one switch module has the necessary logic to transfer different types of data on the same switching layers $530_{1-2}$.

Although not shown in FIG. 5, in one embodiment, the switching layers $530_{1-2}$ may comprise a local rack interconnect with dedicated connections which connect bridge elements 520 located within the same chassis and rack, as well as links for connecting to bridge elements 520 in other chassis and racks.

After the spine element 535 routes the cells, the switching layer $530_2$ may communicate with transport layer modules 526 that translate the cells back to data frames that correspond to their respective communication protocols. A portion of the bridge elements 520 may facilitate communication with an Ethernet network 555 which provides access to a LAN or WAN (e.g., the Internet). Moreover, PCI data may be routed to a downstream PCI port 523 that connects to a PCIe device 450. The PCIe device 550 may be a passive backplane interconnect, as an expansion card interface for add-in boards, or common storage that can be accessed by any of the servers connected to the switch 580.

Although "upstream" and "downstream" are used to describe the PCI ports, this is only used to illustrate one possible data flow. For example, the downstream PCI port 523 may in one embodiment transmit data from the connected to the PCIe device 550 to the upstream PCI port 522. Thus, the PCI ports 522, 523 may both transmit as well as receive data.

A second server 506 may include a processor 509 connected to an operating system 507 and memory (not pictured) which includes one or more virtual machines similar to those found in the first server 505. The memory of server 506 also includes a hypervisor (not pictured) with a virtual bridge (not pictured). The hypervisor manages data shared between different virtual machines. Specifically, the virtual bridge allows direct communication between connected virtual machines rather than requiring the virtual machines to use the bridge elements 520 or switching layers $530_{1-2}$ to transmit data to other virtual machines communicatively coupled to the hypervisor.

A special-purpose processor such as an Input/Output Management Controller (IOMC) 540 is coupled to at least one bridge element 520 or upstream PCI port 522 which provides the IOMC 540 with access to the second switching layer $530_2$. One function of the IOMC 540 may be to receive commands from an administrator to configure the different hardware elements of the distributed virtual switch 580. In one embodiment, these commands may be received from a separate switching network from the second switching layer $530_2$.

Although one IOMC 540 is shown, the system 500 may include a plurality of IOMCs 540. In one embodiment, these IOMCs 540 may be arranged in a hierarchy such that one IOMC 540 is chosen as a master while the others are delegated as members (or slaves).

Figure 6:
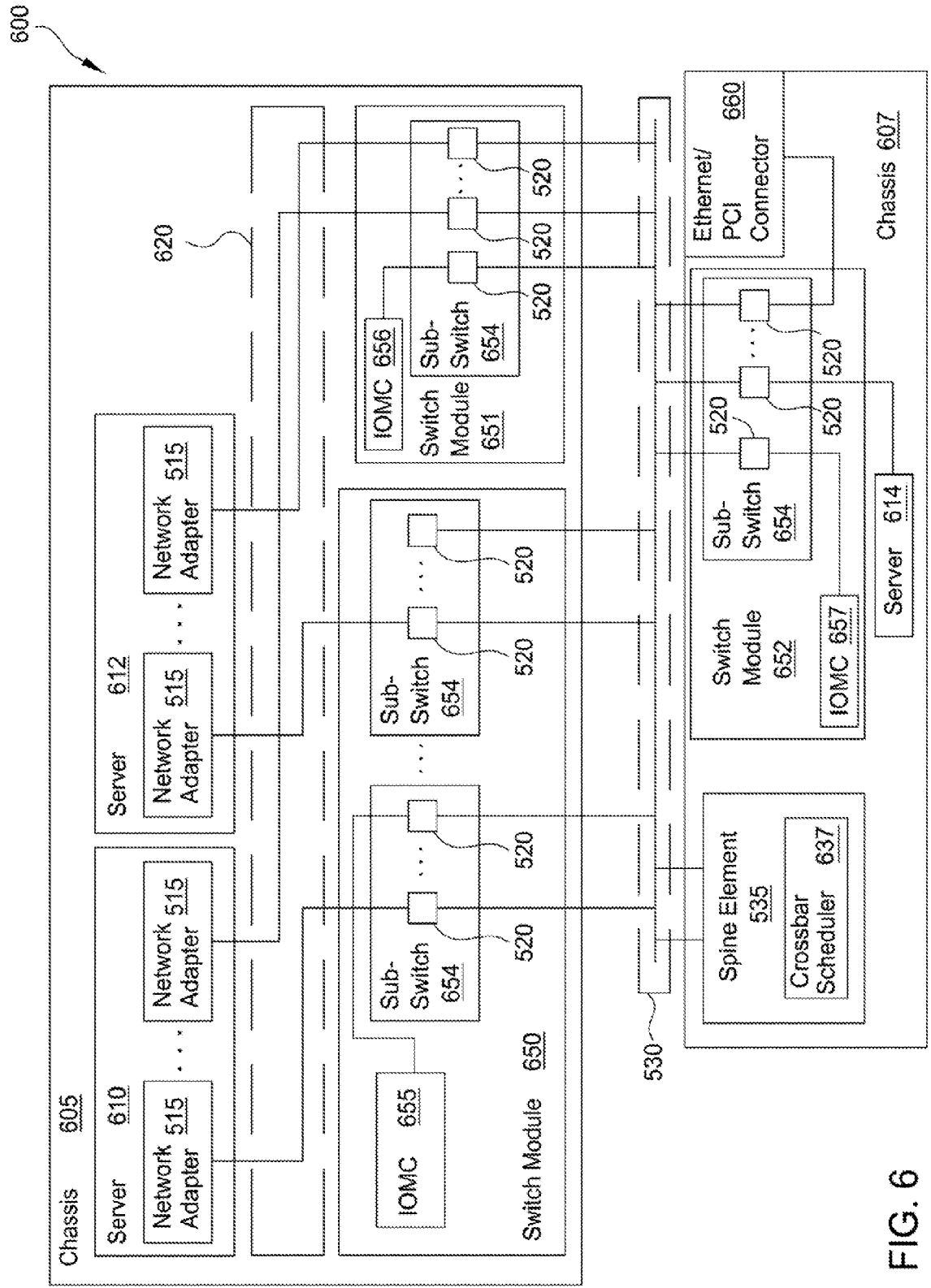
FIG. 6 illustrates a hardware representation of a system that implements a distributed, virtual switch, according to one embodiment presented in this disclosure.

FIG. 6 illustrates a hardware level diagram 600 of the system architecture 500, according to one embodiment presented in this disclosure. Server 610 and 612 may be physically located in the same chassis 605; however, the chassis 605 may include any number of servers. The chassis 605 also includes a plurality of switch modules 650, 651 that include one or more sub-switches 654 (e.g., a microchip). In one embodiment, the switch modules 650, 651, 652 are hardware components (e.g., PCB boards, FPGA boards, etc.) that provide physical support and connectivity between the network adapters 515 and the bridge elements 520. In general, the switch modules 650, 651, 652 include hardware that connects different chassis 605, 607 and servers 610, 612, 614 in the system 600 and may be a single, replaceable part in the computing system.

The switch modules 650, 651, 652 (e.g., a chassis interconnect element) include one or more sub-switches 654 and an IOMC 655, 656, 657. The sub-switches 654 may include a logical or physical grouping of bridge elements 520—e.g., each sub-switch 654 may have five bridge elements 520. Each bridge element 520 may be physically connected to the servers 610, 612. For example, a bridge element 520 may route data sent using either Ethernet or PCI communication protocols to other bridge elements 520 attached to the switching layer 530 using the routing layer. However, in one embodiment, the bridge element 520 may not be needed to provide connectivity from the network adapter 515 to the switching layer 530 for PCI or PCIe communications.

The spine element 535 allows for enhanced switching capabilities by connecting N number of sub-switches 654 using less than N connections, as described above. To facilitate the flow of traffic between the N switch elements, the spine element 535 has a crossbar scheduler 637 which perform the arbitration operations described above. Depending on the embodiment, the crossbar scheduler may be a hierarchical scheduler or a flat scheduler. The inputs ports coming from different sub-switches 654 are grouped into input quads or groups on the spine element 535. The input groups communicate to the crossbar scheduler 637 when one or more of their input ports have packets targeting an output port of the spine element 535, which are also grouped into quads. As described above, the crossbar scheduler 637 provides port-level fairness by granting each input port in the input group an opportunity to send a packet before moving on to another input group.

Each switch module 650, 651, 652 includes an IOMC 655, 656, 657 for managing and configuring the different hardware resources in the system 600. In one embodiment, the respective IOMC for each switch module 650, 651, 652 may be responsible for configuring the hardware resources on the particular switch module. However, because the switch modules are interconnected using the switching layer 530, an IOMC on one switch module may manage hardware resources on a different switch module. As discussed above, the IOMCs 655, 656, 657 are attached to at least one sub-switch 654 (or bridge element 520) in each switch module 650, 651, 652 which enables each IOMC to route commands on the switching layer 530. For clarity, these connections for IOMCs 656 and 657 have been omitted. Moreover, switch modules 651, 652 may include multiple sub-switches 654.

The dotted line in chassis 605 defines the midplane 620 between the servers 610, 612 and the switch modules 650, 651. That is, the midplane 620 includes the data paths (e.g., conductive wires or traces) that transmit data between the network adapters 515 and the sub-switches 654.

Each bridge element 520 connects to the switching layer 530 via the routing layer. In addition, a bridge element 520 may also connect to a network adapter 515 or an uplink. As used herein, an uplink port of a bridge element 520 provides a service that expands the connectivity or capabilities of the system 600. As shown in chassis 607, one bridge element 520 includes a connection to an Ethernet or PCI connector 660. For Ethernet communication, the connector 660 may provide the system 600 with access to a LAN or WAN (e.g., the Internet). Alternatively, the port connector 660 may connect the system to a PCIe expansion slot—e.g., PCIe device 550. The device 550 may be additional storage or memory which each server 610, 612, 614 may access via the switching layer 530. Advantageously, the system 600 provides access to a switching layer 530 that has network devices that are compatible with at least two different communication methods.

As shown, a server 610, 612, 614 may have a plurality of network adapters 515. This provides redundancy if one of these adapters 515 fails. Additionally, each adapter 515 may be attached via the midplane 620 to a different switch module 650, 651, 652. As illustrated, one adapter of server 610 is communicatively coupled to a bridge element 520 located in switch module 650 while the other adapter is connected to a bridge element 520 in switch module 651. If one of the switch modules 650, 651 fails, the server 610 is still able to access the switching layer 530 via the other switching module. The failed switch module may then be replaced (e.g., hot-swapped) which causes the IOMCs 655, 656, 657 and bridge elements 520 to update the routing tables and lookup tables to include the hardware elements on the new switching module.

Figure 7:
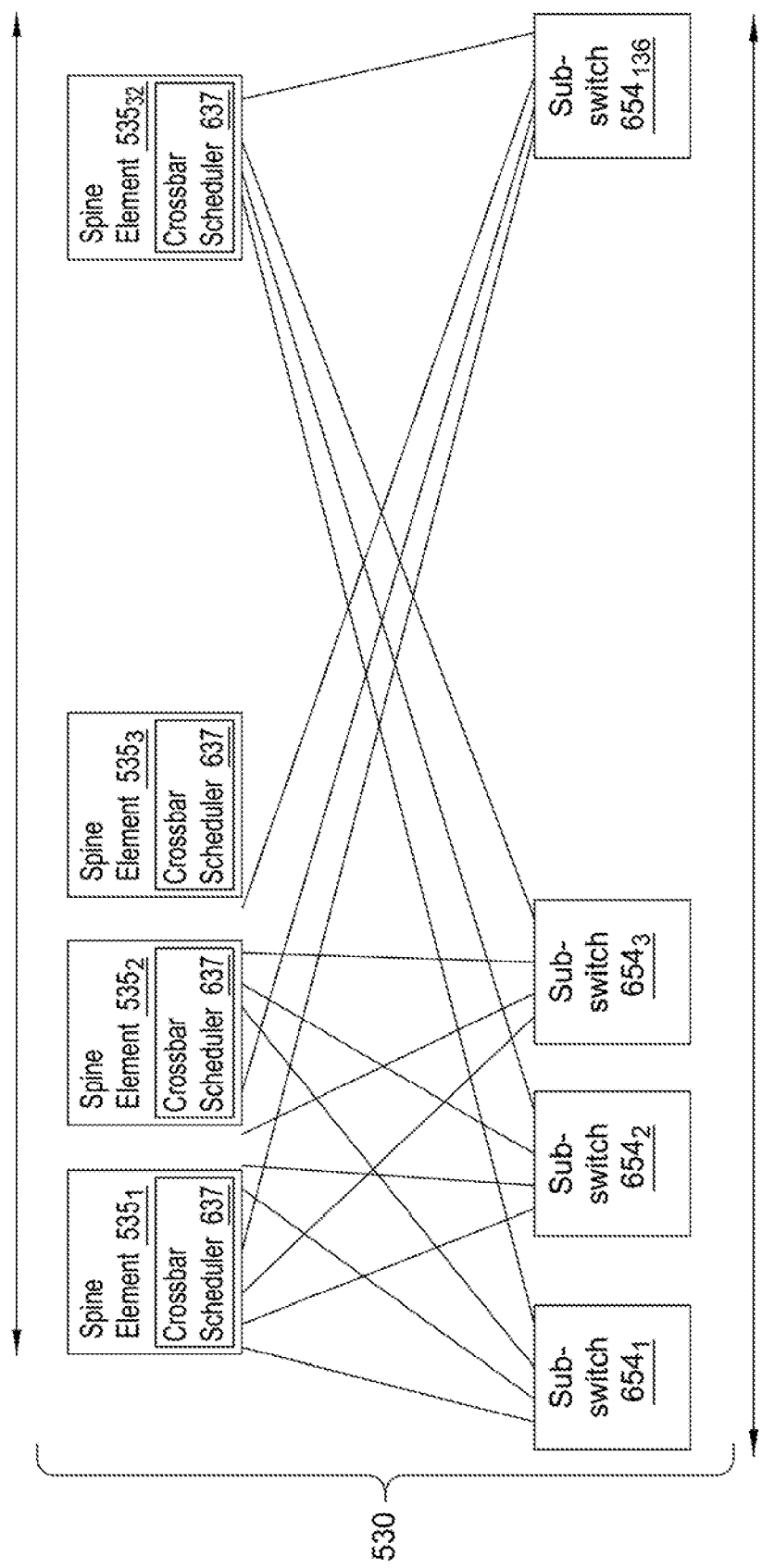
FIG. 7 illustrates a switching layer for a distributed, virtual switch, according to one embodiment presented in this disclosure.

FIG. 7 illustrates the virtual switching layer 530 of the hardware level diagram 600, according to one embodiment presented in this disclosure. As shown, the switching layer 530 may use a spine-leaf architecture where each sub-switch $654_{1-136}$ (i.e., a leaf node) is attached to at least one spine node $635_{1-32}$. The spine nodes $535_{1-32}$ route cells received from the sub-switch $654_N$ to the correct spine node which then forwards the data to the correct sub-switch $654_N$. That is, no matter the sub-switch $654_N$ used, a cell (i.e., data packet) can be routed to another other sub-switch $654_N$ located on any other switch module $654_{1-N}$. Although FIG. 7 is described in conjunction with the presence of one hundred and thirty-six sub-switches and thirty-two spine elements, embodiments disclosed herein are not limited to such a configuration, and other ranges are broadly contemplated.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to provide request-grant-accept arbitration between at least an input arbiter and an output arbiter in a distributed switch, the input arbiter operatively connected to a group of input ports of the distributed switch, the output arbiter operatively connected to a group of output ports of the distributed switch, the computer-implemented method comprising:

receiving, for each of at least one input port of the group of input ports, a respective request specifying for the respective input port to be allocated a clock cycle in which to send data to the group of output ports, wherein the respective request is received from the input arbiter and by the output arbiter;

issuing a grant of the request of a primary input port at each of a first predefined count of consecutive clock cycles, the primary input port comprising a first input port of the at least one input port, wherein the grant is issued by the output arbiter and to the input arbiter; and upon determining, subsequent to the first predefined count of consecutive clock cycles elapsing, that the input arbiter has not yet accepted any grant of the request of the primary input port, issuing a grant at each of a second predefined count of consecutive clock cycles and by operation of one or more computer processors, comprising alternating between issuing a grant of the request of the primary input port and issuing a grant of the request of an alternate input port, respectively.

2. The computer-implemented method of claim 1, wherein data is transferred from the group of input ports to the group of output ports upon each grant being accepted by the input arbiter, wherein accepting a grant comprises sending, from the input arbiter to the output arbiter, an indication that the grant is accepted.

3. The computer-implemented method of claim 2, wherein selection of the alternate input port alternates between at least two ports of the group of input ports, other than the primary input port, based on a predefined alternate port selection scheme, wherein a measure of utilization of the group of output ports is improved when the grant of the request of the primary input port is not being accepted and relative to not alternating issues of grants, wherein a rate of data transfer between the group of input ports and the group of output ports is increased by virtue of the alternate input port being issued grants at alternative clock cycles.

4. The computer-implemented method of claim 3, wherein the second predefined count of consecutive clock cycles is subsequent to the first predefined count of consecutive clock cycles, wherein each of the first and second predefined counts of consecutive clock cycles is configurable via a respective predefined register, wherein the predefined alternate port selection scheme comprises a round robin selection scheme, wherein exactly a single grant is issued per output port per clock cycle, wherein the computer-implemented method further comprises:

upon determining, subsequent to the second predefined count of consecutive clock cycles elapsing, that the input arbiter still has not yet accepted any grant of the request of the primary input port, issuing a grant of the request of the primary input port at each of a third predefined count of consecutive clock cycles subsequent to the second predefined count of consecutive clock cycles.

5. The computer-implemented method of claim 4, wherein the request-grant-accept arbitration is provided by implementing a scheduling scheme by a crossbar scheduler component of the distributed switch, wherein the scheduling scheme comprises a multi-cycle pipelined arbitration scheme configured to support single-cycle data transfer based on alternating grants, wherein the request-grant-accept arbitration comprises distributed request-grant-accept arbitration;

wherein the first input port is selected as a primary input port based on a predefined primary port selection scheme, wherein the predefined primary port selection scheme comprises a pseudorandom scheduling scheme implemented using at least a linear feedback shift register (LFSR).

6. The computer-implemented method of claim 5, wherein the output arbiter is configured to manage a plurality of next-to-serve pointers including a primary next-to-grant pointer and an alternate next-to-grant pointer;

wherein the primary next-to-grant pointer is updated to refer to a next eligible input port only upon a primary advancement condition being satisfied, wherein the primary advancement condition is, in a first instance, satisfied upon the input arbiter accepting a grant of a request of a current input port referred to by the primary next-to-grant pointer, wherein the primary advancement condition is, in a second instance, satisfied upon the input arbiter withdrawing the request of the current input port;

wherein the alternate next-to-grant pointer is updated to refer to a next eligible input port at each clock cycle and regardless of whether the input arbiter has accepted a grant of a current input port referred to by the alternate next-to-grant pointer, wherein an eligible input port comprises an input port having queued data to send to the group of output ports.

7. The computer-implemented method of claim 6, wherein the input arbiter is configured to, at each clock cycle, indicate which of the group of input ports is currently requesting to be allocated a clock cycle in which to send data to the group of output ports;

wherein the output arbiter is configured to, at each clock cycle, send a grant vector to the input arbiter, the grant vector including a separate bit for each input port, each bit containing a bit value indicating whether a request of the respective input port is granted;

wherein the input arbiter is configured to, at each clock cycle, send an accept vector to the output arbiter, the accept vector including a separate bit for each output port, each bit containing a bit value indicating whether a grant of a request the respective input port is accepted;

wherein the output arbiter is configured to operate in an alternate mode subsequent to the first predefined count of consecutive clock cycles elapsing and prior to the second predefined count of consecutive clock cycles elapsing, and in a primary mode otherwise.

8. The computer-implemented method of claim 1, wherein data is transferred from the group of input ports to the group of output ports upon each grant being accepted by the input arbiter.

9. The computer-implemented method of claim 1, wherein accepting a grant comprises sending, from the input arbiter to the output arbiter, an indication that the grant is accepted.

10. The computer-implemented method of claim 1, wherein selection of the alternate input port alternates between at least two ports of the group of input ports, other than the primary input port.

11. The computer-implemented method of claim 1, wherein the alternate input port is selected based on a predefined alternate port selection scheme.

12. The computer-implemented method of claim 1, wherein a measure of utilization of the group of output ports is improved when the grant of the request of the primary input port is not being accepted and relative to not alternating issues of grants.

13. The computer-implemented method of claim 1, wherein a rate of data transfer between the group of input ports and the group of output ports is increased by virtue of the alternate input port being issued grants at alternative clock cycles.

14. The computer-implemented method of claim 1, wherein the second predefined count of consecutive clock cycles is subsequent to the first predefined count of consecutive clock cycles.

15. The computer-implemented method of claim 1, wherein each of the first and second predefined counts of consecutive clock cycles is configurable via a respective, predefined register.

16. The computer-implemented method of claim 1, wherein the alternate input port is selected based on a round robin selection scheme.

17. The computer-implemented method of claim 1, wherein exactly a single grant is issued per output port per clock cycle.

18. The computer-implemented method of claim 1, further comprising:

upon determining, subsequent to the second predefined count of consecutive clock cycles elapsing, that the input arbiter still has not yet accepted any grant of the request of the primary input port, issuing a grant of the request of the primary input port at each of a third predefined count of consecutive clock cycles subsequent to the second predefined count of consecutive clock cycles.

19. The computer-implemented method of claim 1, wherein the request-grant-accept arbitration is provided by implementing a scheduling scheme by a crossbar scheduler component of the distributed switch.

20. The computer-implemented method of claim 19, wherein the scheduling scheme comprises a multi-cycle pipelined arbitration scheme configured to support single-cycle data transfer based on alternating grants.

* * * * *